United States Patent
Albrecht et al.

(10) Patent No.: US 11,514,630 B2
(45) Date of Patent: Nov. 29, 2022

(54) SCALABLE VISUAL ANALYTICS FOR REMOTE SENSING APPLICATIONS

(71) Applicant: International Business Machines Corporation, Armonk, NY (US)

(72) Inventors: Conrad M. Albrecht, White Plains, NY (US); Marcus Oliver Freitag, Pleasantville, NY (US); Sharathchandra Pankanti, Fairfield County, CT (US); Siyuan Lu, Yorktown Heights, NY (US); Hendrik F. Hamann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 16/837,529

(22) Filed: Apr. 1, 2020

(65) Prior Publication Data

US 2021/0312677 A1   Oct. 7, 2021

(51) Int. Cl.
*G06T 11/60* (2006.01)
*G01S 13/89* (2006.01)
(Continued)

(52) U.S. Cl.
CPC .............. *G06T 11/60* (2013.01); *G01S 13/08* (2013.01); *G01S 13/89* (2013.01); *G01S 13/955* (2013.01); *H04W 4/021* (2013.01)

(58) Field of Classification Search
CPC .......... G06T 11/60; G01S 13/08; G01S 13/89; G01S 13/955; H04W 4/021
See application file for complete search history.

(56) References Cited

U.S. PATENT DOCUMENTS

| 8,040,351 B1 * | 10/2011 | Diard | G06T 17/005 |
| | | | 382/167 |
| 10,645,362 B2 * | 5/2020 | Abbas | H04N 13/243 |

(Continued)

FOREIGN PATENT DOCUMENTS

| CN | 106650620 A | 5/2017 |
| JP | 2001004398 A | 1/2001 |
| WO | 2018049740 A1 | 3/2018 |

OTHER PUBLICATIONS

Cui, S., et al., "Complex building description and extraction based on Hough transformation and cycle detection", Remote Sensing Letters, Mar. 2012, pp. 151-159, vol. 3, Issue 2.

(Continued)

*Primary Examiner* — David T Welch
(74) *Attorney, Agent, or Firm* — Scully, Scott, Murphy & Presser, P.C.; Daniel Morris (57) ABSTRACT

Methods and systems for generating a composite image in remote sensing applications are described. In an example, a device can receive an image having a plurality of points specified in an image space. The device can extract a portion of the image and transform points among the extracted portion from the image space to a parameter space defined by a distance parameter and an orientation parameter. The device can identify a set of intersection points in the parameter space that indicate at least one occurrence of a geometry feature in the extracted portion of the image. The device can augment the portion of the image with a plurality of new pixels based on the identified set of intersection points. The device can generate a composite image using the augmented image, where the composite image can include a plurality of augmented images corresponding to other portions of the image.

20 Claims, 8 Drawing Sheets

(51) Int. Cl.
    *H04W 4/021*     (2018.01)
    *G01S 13/95*     (2006.01)
    *G01S 13/08*     (2006.01)

(56) References Cited

U.S. PATENT DOCUMENTS

| | | | |
|---|---|---|---|
| 10,852,838 B2 * | 12/2020 | Bradski | G06F 3/014 |
| 10,896,327 B1 * | 1/2021 | Lablans | G06F 16/538 |
| 2010/0310129 A1 * | 12/2010 | Hopfner | G06T 9/001 |
| | | | 382/104 |
| 2014/0193039 A1 * | 7/2014 | Wexler | G06V 10/44 |
| | | | 382/106 |
| 2014/0254861 A1 * | 9/2014 | Nelson, Jr. | A01B 69/008 |
| | | | 382/100 |
| 2015/0321694 A1 * | 11/2015 | Nelson, Jr. | B62D 6/00 |
| | | | 382/104 |

OTHER PUBLICATIONS

Xu, J., et al., "Automatic Detection of Inshore Ships in High-Resolution Remote Sensing Images Using Robust Invariant Generalized Hough Transform", IEEE Geoscience and Remote Sensing Letters, Dec. 2014, pp. 2070-2074, vol. 11, No. 12.

Sirmacek, B., et al., "Feature Analysis for detecting people from remotely sensed images", Journal of Applied Remote Sensing, Jan. 22, 2013, 13 pages.

NIST, "NIST Cloud Computing Program", http://csrc.nist.gov/groups/SNS/cloud-computing/index.html, Created Dec. 1, 2016, Updated Oct. 6, 2017, 9 pages.

\* cited by examiner

SCALABLE VISUAL ANALYTICS FOR REMOTE SENSING APPLICATIONS

BACKGROUND

The present application relates generally to computers and computer applications, and more particularly to implementing big data platforms storing geospatial data to perform scalable visual analytics for remote sensing applications.

Remote sensing applications can detect and monitor physical characteristics of an area or geographical region in real space. The detected and monitored physical characteristics can be used by other computing systems relating to, for example, land mapping, weather forecasting, environment studies, natural hazards, resource explorations, infrastructure planning, and/or various types of computer-implemented prediction and recommendation systems. Remote sensing applications can execute various image processing techniques to perform visual analytics in order to detect and monitor various physical characteristics.

SUMMARY

In some examples, methods for generating a composite image are generally described. A method can include receiving an image having a plurality of points specified in an image space. The method can further include extracting a portion of the image. The method can further include transforming points among the extracted portion from the image space to a parameter space defined by a distance parameter and an orientation parameter. The method can further include identifying a set of intersection points in the parameter space that indicate at least one occurrence of a geometry feature in the extracted portion of the image. The method can further include augmenting the portion of the image with a plurality of new pixels. The plurality of new pixels can be based on the identified set of intersection points resulting in the definition of a vector field. The method can further include generating a composite image using the augmented image. The composite image can include a plurality of augmented images corresponding to other portions of the image.

In some examples, methods for generating a composite image are generally described. A system can include a memory and a processor configured to be in communication with each other. The processor can be configured to retrieve an image having a plurality of points specified in an image space. The processor can be further configured to extract a portion of the image. The processor can be further configured to transform points among the extracted portion from the image space to a parameter space defined by a distance parameter and an orientation parameter. The processor can be further configured to identify a set of intersection points in the parameter space that indicate at least one occurrence of a geometry feature in the extracted portion of the image. The processor can be further configured to augment the portion of the image with a plurality of new pixels, where the plurality of new pixels can be based on the identified set of intersection points. The processor can be further configured to generate a composite image using the augmented image. The composite image can include a plurality of augmented images corresponding to other portions of the image.

In some examples, a computer program product for generating a composite image is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

High resolution images, such as satellite images, can include relatively large amount of pixels, causing increased complexity in performing various image processing techniques. A computer device implementing remote sensing applications to analyze these high resolution images may need to consume more resources (e.g., power, time, memory, etc.) due to the increased complexity. The methods and systems being described in accordance with the present disclosure can provide a piecewise approach to perform visual analytics on high resolution images when implementing remote sensing applications. The piecewise approach can allow portions of high resolution images to be processed by remote sensing applications sequentially, and sometimes in parallel, causing reduced resource consumption. Further, the system can be implemented with existing big data and geospatial data platforms to process relatively large amounts of data from high resolution images.

Figure 1:
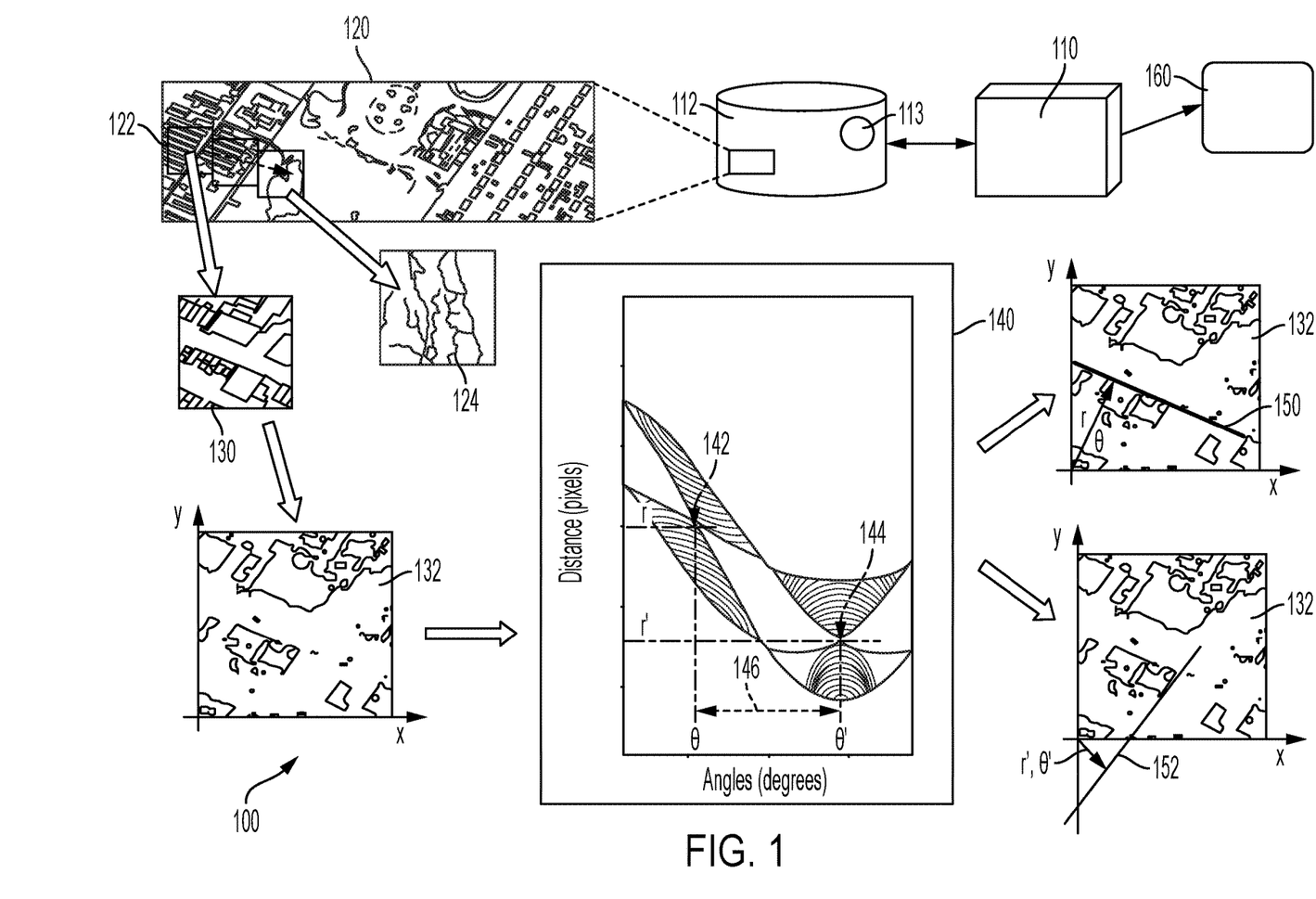
FIG. 1 is a diagram showing an example computer system that can implement scalable visual analytics in remote sensing applications in one embodiment.

FIG. 1 is a diagram showing the example computer system 100 that can implement scalable visual analytics for remote sensing applications in one embodiment. The system 100 can include a processor 110 and a memory 112 configured to be in communication with each other. In some examples, the processor 110 and the memory 112 can be components of a computer device such as a server, a desktop or laptop computer, and/or other types of computer devices. The memory 112 can be configured to store data and instructions that can be used by the processor 110 to implement the system 100. For example, the memory 112 can store instructions 113 that can be executed by the processor 110 to perform the methods described in accordance with the present disclosure. The instructions 113 being stored in the memory 112 can include source code that can be compiled by the processor 110, object code resulting from compilation of source code, and/or executable code that can be run and loaded by the processor 110. In an example, the instructions 113 can be executed by the processor 110 to perform various image processing techniques, such as sliding window algorithms, edge detection, filtering techniques, transformation between an image space to a parameter space (e.g., Hough transform), and/or other techniques. In some examples, the processor 110 and the memory 112 can be components of a cloud computing platform. The processor 110 can be configured to be in communication with other devices, such as user devices and servers, through a network (e.g., Internet).

The memory 112 can further include a database storing image data of a plurality of images, such as an image 120. The image 120 can be, for example, a high resolution image such as a satellite image. In an example, a user or another computer device can send a request to the processor 110. The request can be a request for the processor 110 to perform remote sensing application on a particular geographical region, such as one or more cities, towns, states, countries, and/or other types of geographical regions. The remote sensing application being performed by the processor 110 can include, for example, detecting roads, structures (e.g., buildings), objects (e.g., trees), and/or other physical entities in the particular geographical region indicate by the request. The processor 110 can receive the request and extract one or more images associated with the particular regions, such as the image 120, from the memory 112.

The processor 110 can generate a sliding window 122 that can be used to extract discrete portions of the image 120 for further processing. For example, the processor 120 can generate the sliding window 122 and execute a sliding window algorithm to extract a portion 130 of the image 120 to apply the remote sensing application. Upon completing the remote sensing application on the portion 130, the processor 110 can move the sliding window 122 to a subsequent portion of the image 120 and extract the subsequent portion to apply the remote sensing application. The processor 110 can continue to move the sliding window 122 among different portions of the image 120 until substantially all portions of the image 120 are processed by the remote sensing application.

In another example, the processor 110 can include multiple processing elements configured to perform the same operations. For example, the processor 110 can include multiple processor cores, and each processor core can be configured to perform the remote sensing application on respective portions of the image 120 in parallel. For example, a first processor core can process the portion 130 sequentially towards the portion 124 using the sliding window 122, and a second processor core can process other portions of the image 120 using another sliding window, in parallel. The parallel processing can allow the system 100 to perform remote sensing application on the image 120 with improved efficiency.

The remote sensing application being executed by the processor 110 can include a preprocessing pipeline to convert the portions of image 120 into a plurality of binary images. In an example, the processor 120 can convert the portion 130 of the image 120 into a binary image 132. The conversion of the portion 130 into the binary image 132 can include performing mean thresholding on the portion 130 to generate an intermediate image, then performing edge detection on the intermediate image to generate the binary image 132. The processor 110 can transform the points among the binary image 132 from an image space to a parameter space 140 of N-dimensions, where N can be greater than or equal to two. In the example shown in FIG. 1, the parameter space 140 can be a 2-dimensional parameter space defined by the Hough parameters, e.g., Hough parameter space. The processor 110 can perform the Hough transform on the binary image 132 to transform the points among the binary image 132 from an image space to the 2-dimensional parameter space 140. By way of illustration, the Hough parameter space can be two-dimensional composing an image itself where each pixel represents the signal strength of the Hough transform for a given parameter combination of "Angle" and "Distance". In an example, the points being transformed can be fixed to locations among the image space where a particular pixel "is present" or "is absent". For example, focusing on the binary image 132, the binary image 132 can include two pixel values corresponding to black (pixel value 255) and white (pixel value 0). Although the Hough transform can act on grayscale images, its signal can be significantly enhanced when the processor 110 performs the Hough transform on the binary image 132. In some examples, a grayscale value from 0 to 1 can be interpreted as probability of the pixel "being present".

In an example, the image space of the binary image 132 can be a two-dimensional Cartesian space defined by two perpendicular axes (x-axis and y-axis). As briefly mentioned above, the Hough parameter space 140 can be a two-dimensional parameter space defined by the Hough parameters—a distance parameter (denoted as r, which can be the distance of the straight line from some origin, typically a corner of the image) and an angle or orientation parameter (denoted as θ) of the straight line with distance r relative to a face of the image boundary. In an example, given a single point in the image space (e.g., Cartesian space), a set of straight lines going through the given point corresponds to a sinusoidal curve in the Hough parameter space and the sinusoidal curve is unique to the given point. In cases where at least two points form a straight line in the image space, their sinusoidal curves can intersect at a particular point in the Hough parameter space 140. Using the Hough parameter space 140, an intersection point of the curves in the Hough parameter space 140 can correspond to a line, or a linear array of points, in the image space of the binary image 132. The processor 110 can transform all points among the binary image 132 to the parameter space 140. In an example, since the sinusoidal curves of all points in image space can get added in Hough parameter space, prominent peaks can form at some fixed (r, θ) combinations where all the sinusoidal curves intersect (e.g., an intersection point). The intersection of the sinusoidal curves can indicate a strong signal with high intensity I(r, θ) (cf. discussion below regarding vector feature map generation for Hough flow) from a set of points forming a straight line with distance r and angle θ in image space.

In the example shown in FIG. 1, the processor 110 can identify an intersection point 142 and an intersection point 144 in the Hough parameter space 140. The intersection point 142 can correspond to a distance parameter (or distance) of "r pixels" and an orientation parameter (or angle) of "θ degrees", and intersection point 144 can correspond to a distance parameter of "r' pixels" and an orientation parameter of "θ' degrees". The values of the distance and orientation parameters corresponding to an intersection point in the parameter space 140 can indicate a presence of a line, or a linear array of pixels, in the image space of the binary image 132. For example, the intersection point 142 can indicate that there is a line or linear array of pixels 150 perpendicular to a vector defined by the distance "r pixels"

from the origin (e.g., (x, y)=(0, 0)) at an angle "θ degrees" in the image space of the binary image 132. Similarly, the intersection point 144 can indicate that there is a line or linear array of pixels 152 perpendicular to a vector defined by the distance "r' pixels" from the corner (x, y)=(0, 0) at an angle "θ' degrees" in the image space of the binary image 132. In an example, a straight line (e.g., 150 or 152) can be parameterized by x=$x_0$+a, where the constant vector $x_0$=($x_{00}$, $x_{01}$) is an arbitrary but fixed point on the line with $x_{00}$ the x-coordinate component and $x_{01}$ the y-coordinate component. The parameter vector a=ae employs a scalar value, a, to move along the line with e=(cos θ, sin θ), which is a vector of unit length and angle θ relative to a chosen, fixed face of the image. Note that bold fonts indicate a vector herein. A set of linear equations x=±r can be defined, with r=rb, and b=(−sin θ, cos θ) such that the scalar product a·b=0 implies r(θ)=±$x_0$·b. The angle parameter θ can be defined as ranging from 0 to 180 degrees, where values beyond (e.g., 180 to 360) can be considered redundant as they can parameterize the same straight line. Based on this redundancy, the ±$x_0$ term can keep a value of r(θ) positive.

The processor 110 can identify one or more occurrences of particular, straight line related, geometry features in the binary image 132 based on the identified intersection points in the Hough parameter space 140. For example, the processor 110 can identify a number of right angles in the binary image 132 based on the identified intersection points in the Hough parameter space 140. To identify a right angle, the processor 110 can determine an angle difference between each pair of identified intersection points in the Hough parameter space 140. For example, the processor 110 can determine an angle difference 146, defined as |θ−θ'|, between the intersection points 142 and 144. The processor 110 can compare the angle difference 146 with a threshold or a range of values, and based on whether the angle difference is compliant or noncompliant with the threshold, the processor 110 can determine whether the lines 150 and 152 in the portion 130 form a right angle. For example, the threshold can indicate "90+/−5 degrees", or a range of "85 to 95 degrees". In some examples, the threshold can be defined based on a request from a user of the system 100. For example, a user of the system 100 can request a characteristic angle Θ, such as 90 degrees, and the processor 110 can define a range that includes the requested characteristic angle. In a case where the angle difference 146 is compliant with the threshold, such as having a value between "85 to 95 degrees", the processor 110 can determine that the lines 150 and 152 forms an angle that may be substantially a right angle. In a case where an angle difference is noncompliant with the threshold, such as being outside of the range "85 to 95 degrees", the processor 110 can determine that the lines corresponding to the noncompliant angle difference may not form an approximate right angle.

The threshold can be adjusted, such as by a user of the system 100, or based on various constraints defined in the instructions 113. For example, the instructions 113 can indicate a constraint to identify at most k occurrences of right angles in each portion of the image 120. If the processor 110 identifies more than k occurrences of right angles in the portion 130, the processor 110 can adjust the threshold, such as modifying the threshold to a range of "87 to 93 degrees", to decrease a sensitivity in identifying right angles in the binary image 132. In an example, the occurrences of right angles in the binary image 132 can indicate a presence of structures, such as buildings, in the binary image 132 or the portion 130.

In another example, a user of the system 100 can request a characteristic distance, such as R, where the characteristic distance can correspond to sizes (e.g., length and width) of structures or buildings. The processor 110 can, for example, determine a difference between intersection points (e.g., 142 and 144) along the Distance axis in the parameter space 140 to determine distance between the lines 150 and 152. Further, a user of the system 100 can request expected values of characteristic distances R. For example, a range of expected distances R can be [D−d, D+d], where D denotes a mean of R, and d denotes standard deviation of R. The requested expected values can be used by the system 100 as a distance threshold to detect geometry features, such as lines, that may be compliant with the user's requested expectation. For example, right angles can be detected by the user demanding Θ to be compliant with the relative angle interval [90°−5°=85°, 90°+5°=95°].

The processor 110 can identify intersection points in the parameter space 140 and determine angle differences to identify right angles in the binary image 132. The processor 110 can analyze the identified right angles to identify objects, such as structures resembling buildings, in the binary image 132. Upon a completion of identifying geometry features (e.g., right angles or distances of straight lines such as roads or faces of houses) and/or objects in the binary image 132, the processor 110 can move the sliding window 122 to a next portion of the image 120. The processor 110 can identify right angles and objects in each portion of the image 120. The processor 110 can generate a composite image 160 by augmenting new pixels and/or image objects to the image 120 based on the identified right angles and objects among the portions of the image 120. To be further described below, the processor 110 can use the composite image 160 for various applications, or can send the composite image 160 to another computing system.

The system 100 can be implemented for images in two or more dimensions. For example, the system 100 can be implemented for images in 3-dimensional (3D) space. In an example, the image 120 can be a 3D image and can be an image being used for volumetric navigation in virtual reality (VR) or augmented reality (AR) applications. Such VR or AR applications can be applications related to, for example, medical surgery, plumbing, geology, archeology, mining, etc. When the image 120 is a 3D image, the parameter space 140 can be a 3D gradient space, and the processor 110 an identify extremas in the 3D gradient space to identify objects and structures of particular geometry features or shapes. Further, for 3D applications, the composite image 160 can be a 3D image having a distribution of 3D volumes that can be "empty or filled", or "dense or sparse".

Figure 2:
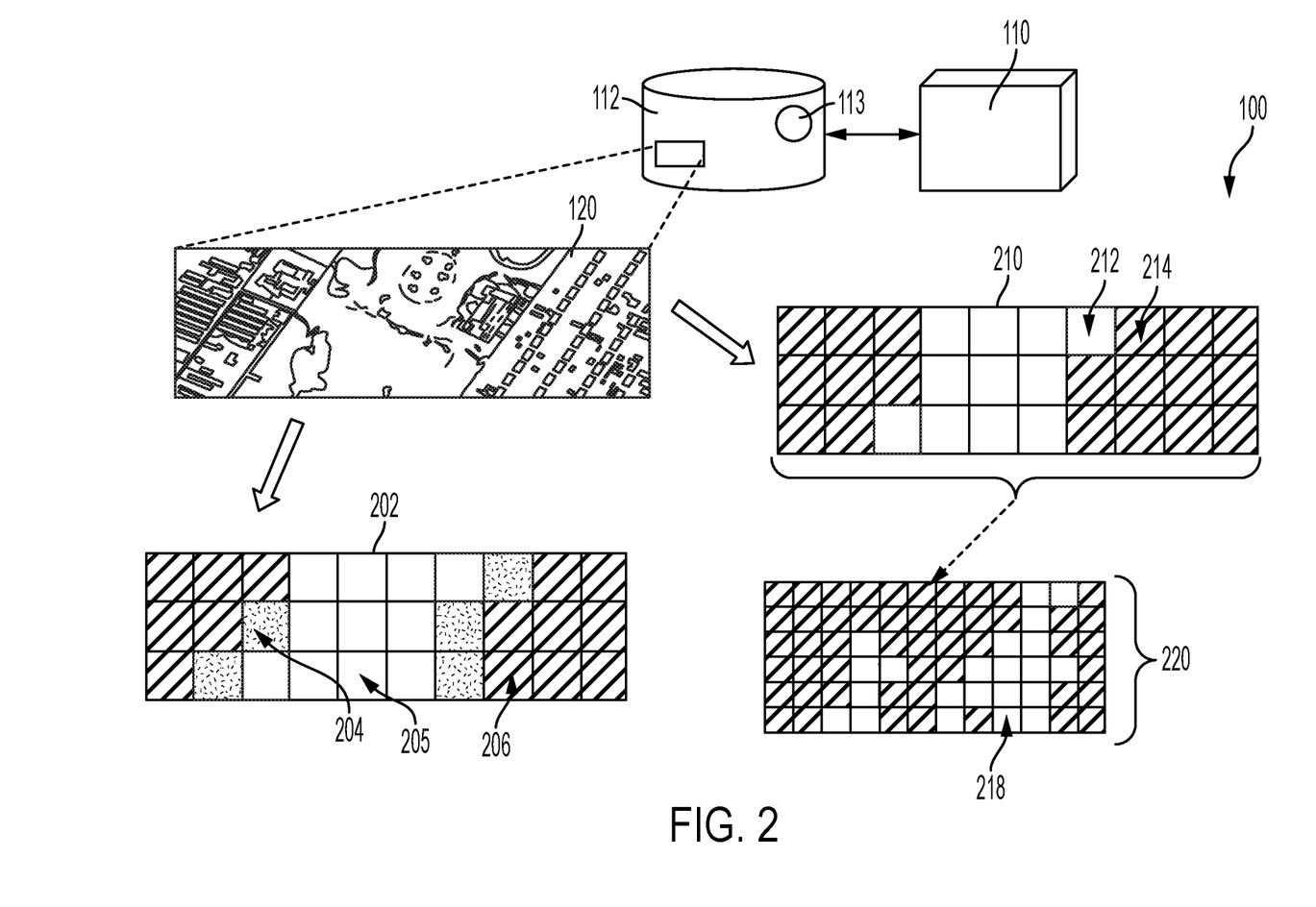
FIG. 2 illustrates an example implementation of scalable visual analytics in remote sensing applications in one embodiment.

FIG. 2 illustrates an example implementation of scalable visual analytics in remote sensing applications in one embodiment. In the example shown in FIG. 2, the processor 110 can partition the image 120 into a grid-like structure, where each grid can be a portion of the image 120 (e.g., portion 130) extracted using the sliding window 122. The processor 110 can identify a number of right angles in each portion or each grid of the image 120. The number of right angles identified by the processor 110 can be used to generate composite images for various applications.

In an example embodiment, the processor 110 can augment pixels of different values, shades and/or intensities on the entirety of the portions to generate a new image that represents different levels of structures among the portions of the image 120. For example, the processor 110 can generate a composite image 202, where the composite image 202 can include a plurality of portions corresponding to the portions extracted from the image 120 by the sliding window 122. Each portion among the composite image 202 can be shaded or overlaid with a different shade or intensity. For example, a portion 204 can be shaded with a first pixel value (e.g., grey), a portion 205 can be shaded with a second pixel value (e.g., white), and a portion 206 can be shaded with a third pixel value (e.g., black). The different pixel values being used for the shading can correspond to a number of right angles identified, by the processor 110, in the portions among the image 120. For example, the second shading (e.g., white) can indicate "0 to 10" right angles identified, the first shading (e.g., grey) can indicate "11 to 30" right angles identified, and the third shading (e.g., black) can indicate "31 or more" right angles identified. Depending on a desired implementation of the system 100, different number of shades, pixel values, intensity level, can be used, and each shading can represent different range of right angles identified in corresponding portions. The processor 110 can generate images similar to the image 202 for each portion of the image 120, and stitch the generate images together to form another composite of larger scale.

In another example embodiment, the processor 110 can augment pixels of two colors and/or two intensities on the entirety of the portions to generate an image representing a binary distribution of structures among a portion of the image 120. For example, the processor 110 can generate a binary grid image 210, where the binary grid image 210 can include a plurality of portions corresponding to the portions extracted from the image 120 by the sliding window 122. Each portion among the composite image 210 can be shaded with either a first color (or intensity) or a second color (or intensity). For example, a portion 212 can be shaded with a first pixel value (e.g., white) and a portion 214 can be shaded with a second pixel value (e.g., black). The two pixel values being used for the shading can correspond to a number of right angles identified, by the processor 110, in the portions among the image 120. For example, the first shading (e.g., white) can indicate "less than 10" right angles identified, and the second shading (e.g., black) can indicate "more than 10" right angles identified.

The processor 110 can use the binary grid image 210 to generate a composite image 220. In the example shown in FIG. 2, the composite image 220 can be a binary distribution of structures among the image 120. The processor 110 can determine a majority of the binary distribution among each portion, and assign one of the two binary shadings (black or white) to overlay the portions of the image 120 to generate the composite image 220. For example, the image 210 can have 19 grids shaded in black, and 11 grids shaded in white. The processor 110 can determine that the black shading is the majority, and assign the black shading to the image 120 in the composite image 220. The processor 110 can perform the remote sensing application described above to identify the numbers of right angles in each portion of a corresponding image stored in the memory 112, use the binary distribution of the portions to assign binary shading values to the images stored in the memory 112, and stitch these images with the assigned binary values to generate the composite image 220. For example, in the composite image 220, an image 218 can be assigned with the white shading to indicate that "less than 10" right angles are identified in a raw image (e.g., another satellite image different from the image 120) corresponding to the binary grid image 218.

In an example embodiment, the processor 110 can use these composite images in other applications, such as land mapping, weather forecasting, environment studies, natural hazards, resource explorations, infrastructure planning, and/ or various types of computer-implemented prediction and recommendation systems. For example, the processor 110 can utilize these composite images in infrastructure planning systems to identify an optimal geographical region to build new landmarks or buildings. In another example, the processor 110 can utilize these composite images in urban planning to determine population distribution among a geographical region. For example, an area with relatively high number of right angles can be more likely to include relatively more structures, and greater population.

Figure 3:
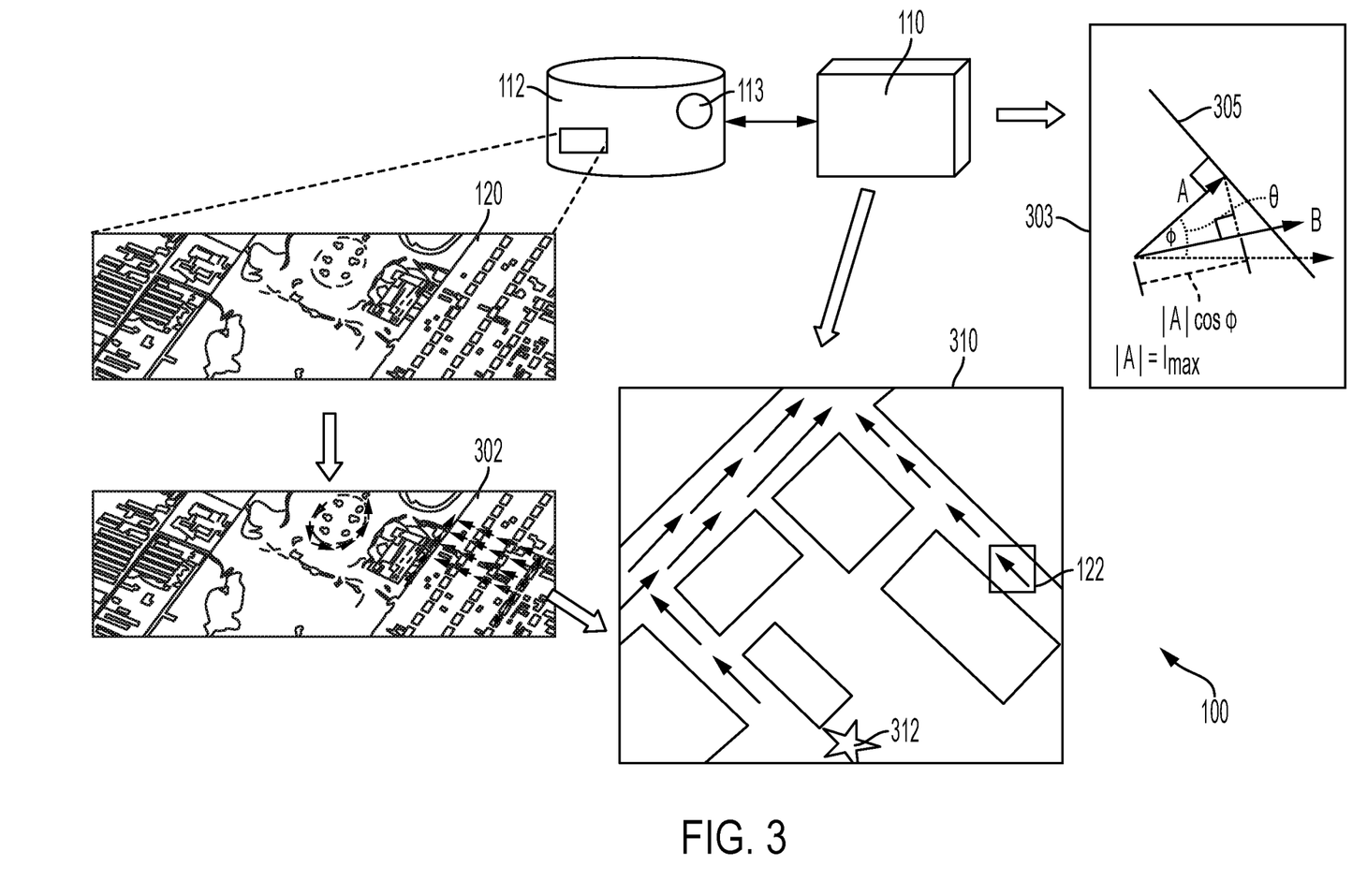
FIG. 3 illustrates another example implementation of scalable visual analytics in remote sensing applications in one embodiment.

FIG. 3 illustrates an example implementation of scalable visual analytics in remote sensing applications in one embodiment. In the example shown in FIG. 3, the processor 110 can augment a plurality of pixels on the image 120 to generate a composite image 302. The plurality of pixels being augmented can be based on the number of right angles identified in the portions among the image 120. In an example shown in FIG. 3, the augmented plurality of pixels can form a flow map representing flows surrounding objects or structures corresponding to the identified right angles in the image 120. Focusing on a portion 310 of the composite image 302, the portion 310 has a plurality of arrows formed by pixels augmented onto the image 120 by the processor 110. The pixels forming these arrows can be based on a plurality of vectors determined by the processor 110 based on the lines and/or right angles identified using the Hough parameter space (e.g., as shown in FIG. 1). Each arrow among the composite image 302 can correspond to a portion extracted by the sliding window 122 (e.g., the portion 130). For example, if the image 120 is partitioned into 1,000 portions (the sliding window 122 extracted a portion for 1,000 times), then there can be 1,000 arrows augmented onto the image 120.

In an example, to determine a vector that can be augmented onto the image 120 as an arrow, the processor 110 can identify an intersection point (r, θ) with maximum intensity $I_{max}(r, θ)$ in the Hough parameter space 140. The processor 110 can identify the line of pixels 305 in the image space 303 (e.g., image space of the image 120) that corresponds to the identified intersection point with maximum intensity. The vector A in the image space 303 has magnitude $|A|=I_{max}$ and angle θ or θ+180 specifying vector A's direction. The system 100 can select either θ or θ+180 based on a preferred direction that can be specified by an application, such as a physical constraint that can demand all vectors A have to point towards north, and not towards south. Another constraint could be to maximize curls and sources/sinks of the vector field A discussed in some more detail regarding applications below. Moreover, depending on the definition of θ relative to a given image face in 303 (see discussion above), a rotation by 90° might be convenient to make A parallel (not perpendicular) to the corresponding line 305. For example, this transformation can be performed for the portion 310 where arrows, such as the arrow shown in sliding window 122, are parallel to faces of structures (e.g., houses).

A fixed unit vector B can be defined arbitrarily by the system 100 (or sometimes a user of the system 100), and can allow the system 100 to compute a scalar value A·B, where the scalar value A·B can be used by the system 100 to define a resonance field with values $|A| \cos \phi$, where the magnitude $|A|$ is the maximum intensity $I_{max}$, and the angle φ can be an angle between the vector A and the unit vector B. Plotting the scalar value A·B can provide a resonance map that visualizes regions that may be strongly aligned and parallel to B. The processor 110 can augment pixels to form an arrow indicating the length and direction of the vector A within the sliding window 122. For example, the portion of the image 120 that is being extracted by the sliding window 122 for processing can be augmented with pixels forming an arrow. The processor 110 can determine vectors A for each portion of the image 120, and stitch the portions with their corresponding resonance vectors to form the composite image 302.

The composite image 302, with the augmented arrows, can be used by various applications. For example, based on the derived vector field A, the processor 110 can implement prediction systems that can run machine learning or hydrodynamic models to predict escape routes within a geographical region in response to emergency situations. The arrows plotted in the composite image 302 can be indicative of a predicted escape route to navigate around structures in a densely populated region. As an example, the arrows can signal straight visual lines that a pedestrian can experience when orienting oneself based on a city's architecture and infrastructure. In another example, the processor 110 can predict an amount of time for a population to escape using the routes indicated by the augmented arrows in the composite image 302. If the predicted amount of time is not optimal, the processor 110 can iteratively alter directions of particular arrows to analyze how different escape routes can affect the predicted amount of time. In another example, the processor can correlate the flows indicated by the augmented arrows with traffic patterns in the geographical region, and infer traffic patterns from the computed flows of another geographical region for urban development purposes (e.g., road planning and structure locations planning). In another example application, the vector field A can be exploited to identify sources (non-vanishing divergence $\nabla \cdot A \neq 0$) and curls ($\nabla \times A \neq 0$). In the context of escape route analysis, where curls can indicate regions with little visual guidance (forests, parks, etc.), and sources or sinks can identify regions where escape routes accumulate. For instance, hot spots can be generated to indicate a population coming together in emergency scenarios. Such insight may help improve the design of cities, and may identify critical infrastructure in terms of escape routes. In general, the structure of the vector field based on sources or sinks, and curls, as well as the statistics of dominant relative angles $\Theta$ and distances R can provide insight to cultural characteristics of urban areas.

Figure 4:
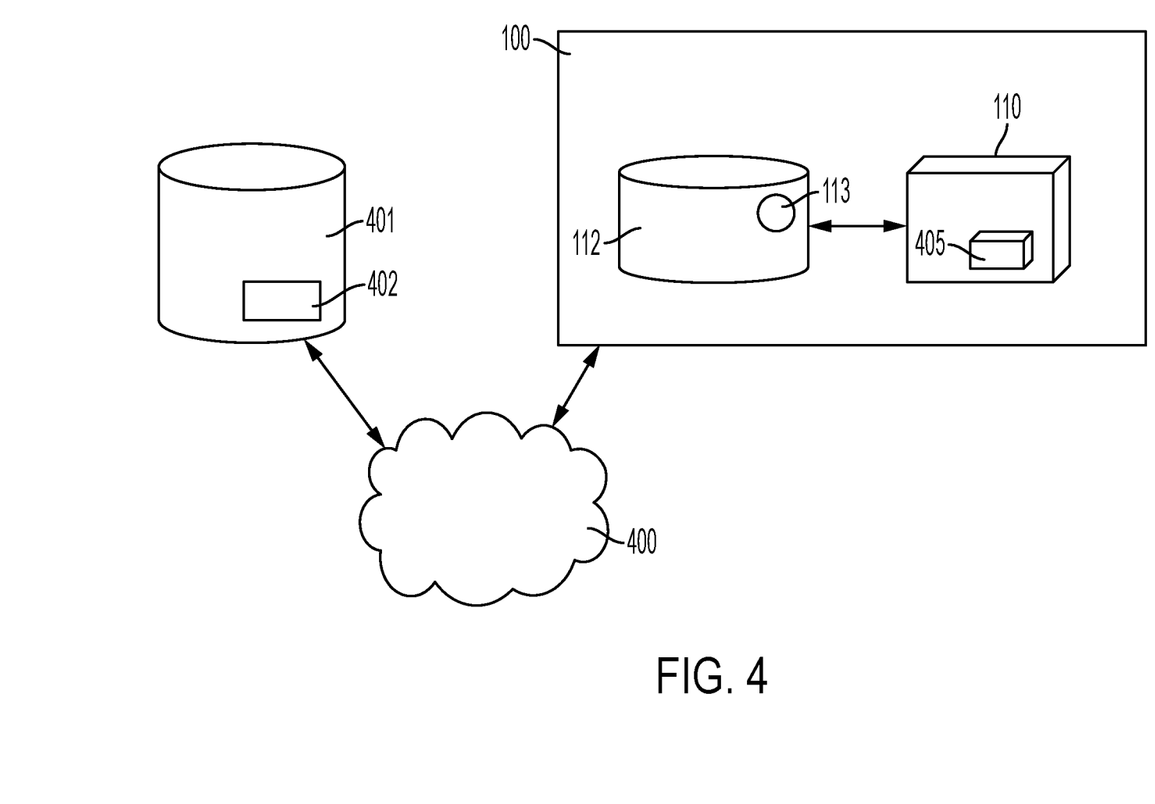
FIG. 4 is a diagram showing an example implementation of the example computer system of FIG. 1 in accordance with scalable visual analytics in remote sensing applications in one embodiment.

FIG. 4 is a diagram showing an example implementation of the example computer system of FIG. 1 in accordance with scalable visual analytics in remote sensing applications in one embodiment. In an example, a big data platform 401 can be configured to be in communication with the system 100 through a network 400. The big data platform 401 can store geospatial-temporal data 402, where the geospatial-temporal data 402 can include data collected from data sources such as satellites, drones, Internet of Things (IoT) devices, cell phones, social media, weather reports, and/or other data sources. The network 400 can be the Internet, cellular network, and/or other types of communication network. The big data platform 401 can have, for example, more than ten terabytes of geospatial-temporal data. The geospatial-temporal data 402 can be continuously updated. In some examples, the big data platform 401 can be a cloud-based service that utilizes hyperspectral imaging, and can be a cloud-based data store and data analytics service that can analyze complex geospatial-temporal data sets.

The big data platform 401 can load the geospatial-temporal data 402 to the memory 112 of the system 100, and the processor 110 can be configured to implement a database module 405 to store the geospatial-temporal data 402 in the memory 112 under a defined data structure. The processor 110 can further implement the database module 405 to perform structured data processing using structured query language (SQL). For example, the processor 110 can implement an Apache Spark module and use Spark SQL to process the geospatial-temporal data 402 being stored in the memory 112. The processor 110 can also store data relating to the system 100 (e.g., size of sliding window 122, right angles identified for portions of images, structures identified, resonance vectors, pixels being augmented, etc.) in the memory 112 under the same data structure as the geospatial-temporal data 402. The storing of the geospatial-temporal data 402 and the data generated by the system 100 in the same data structure can allow the processor 110 to perform the remote sensing application on large amounts of data (e.g., high resolution images). Particularly, Spark SQL on Spark dataframes can implement distributed relational database tables built on Spark's native Resilient Distributed Dataset in a fault-tolerant way spread across a cluster of (commodity) computing machines.

Figure 5:
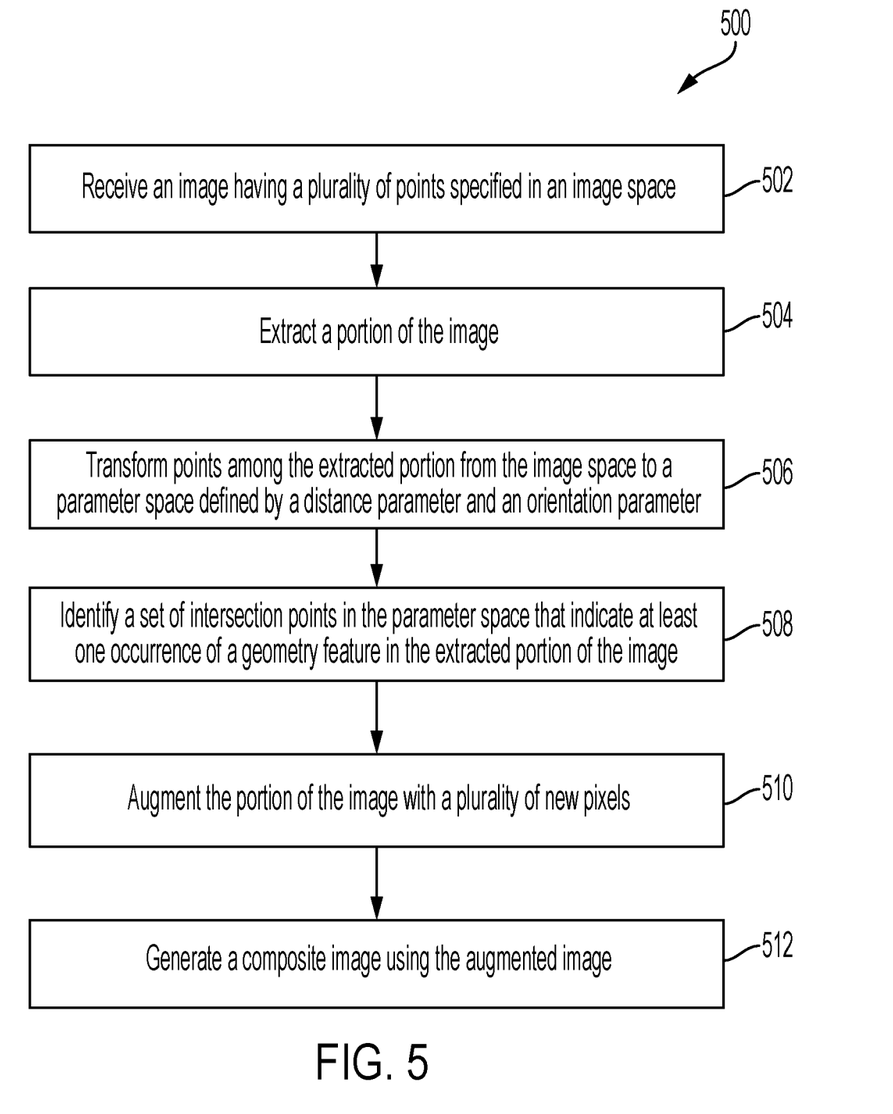
FIG. 5 is a flow diagram illustrating a process for implementing scalable visual analytics in remote sensing applications in one embodiment.

FIG. 5 is a flow diagram illustrating a process for implementing scalable visual analytics in remote sensing applications in one embodiment. An example process 500 may include one or more operations, actions, or functions as illustrated by one or more of blocks 502, 504, 506, 508, 510, and/or 512. Although illustrated as discrete blocks, various blocks can be divided into additional blocks, combined into fewer blocks, eliminated, or performed in parallel, depending on the desired implementation.

The process 500 can begin at block 502. At block 502, a device can receive an image having a plurality of points specified in an image space. In some examples, the image can be a satellite image. The process can continue from block 502 to block 504. At block 504, the device can extract a portion of the image. The process can continue from block 504 to block 506. At block 506, the device can transform points among the extracted portion from the image space to a parameter space defined by a distance parameter and an orientation parameter. In some examples, the parameter space can be a Hough parameter space, and transforming the points among the extracted portion can include performing a Hough transform on the points among the extracted portion. The process can continue from block 506 to block 508. At block 508, the device can identify a set of intersection points in the parameter space that indicate at least one occurrence of a geometry feature in the extracted portion of the image. In some examples, the geometry feature can be a right angle.

The process can continue from block 508 to block 510. At block 510, the device can augment the portion of the image with a plurality of new pixels. The plurality of new pixels can be based on the identified set of intersection points. For example, the device can determine an angle difference between a pair of identified intersection points in the parameter space. The device can compare the angle difference with a threshold. In response to the angle difference being compliant with the threshold, the device can identify an occurrence of the geometry feature and generate the plurality of new pixels based on the identified occurrence of the geometry feature. In another example, the device can determine a number of occurrences of the geometry feature in the portion, and generate the plurality of new pixels based on the number of identified occurrences of the geometry feature. The process can continue from block 510 to block 512. At block 512, the device can generate a composite image using the augmented image. The composite image can include a plurality of augmented images corresponding to other portions of the image.

In some examples, the device can assign a pixel value to the plurality of pixels based on the number of identified occurrences of the geometry feature. The device can augment the portion of the image with pixels of the assigned pixel value to overlay the portion of the image, where the composite image is a grid map showing distributions of different numbers of identified occurrences of the geometry feature. In some examples, the device can identify an intersection point in the parameter space having maximum intensity. The device can generate a vector based on the identified intersection point having maximum intensity, where the composite image can be a flow map showing directions of different vectors corresponding to the plurality of augmented images.

Figure 6:
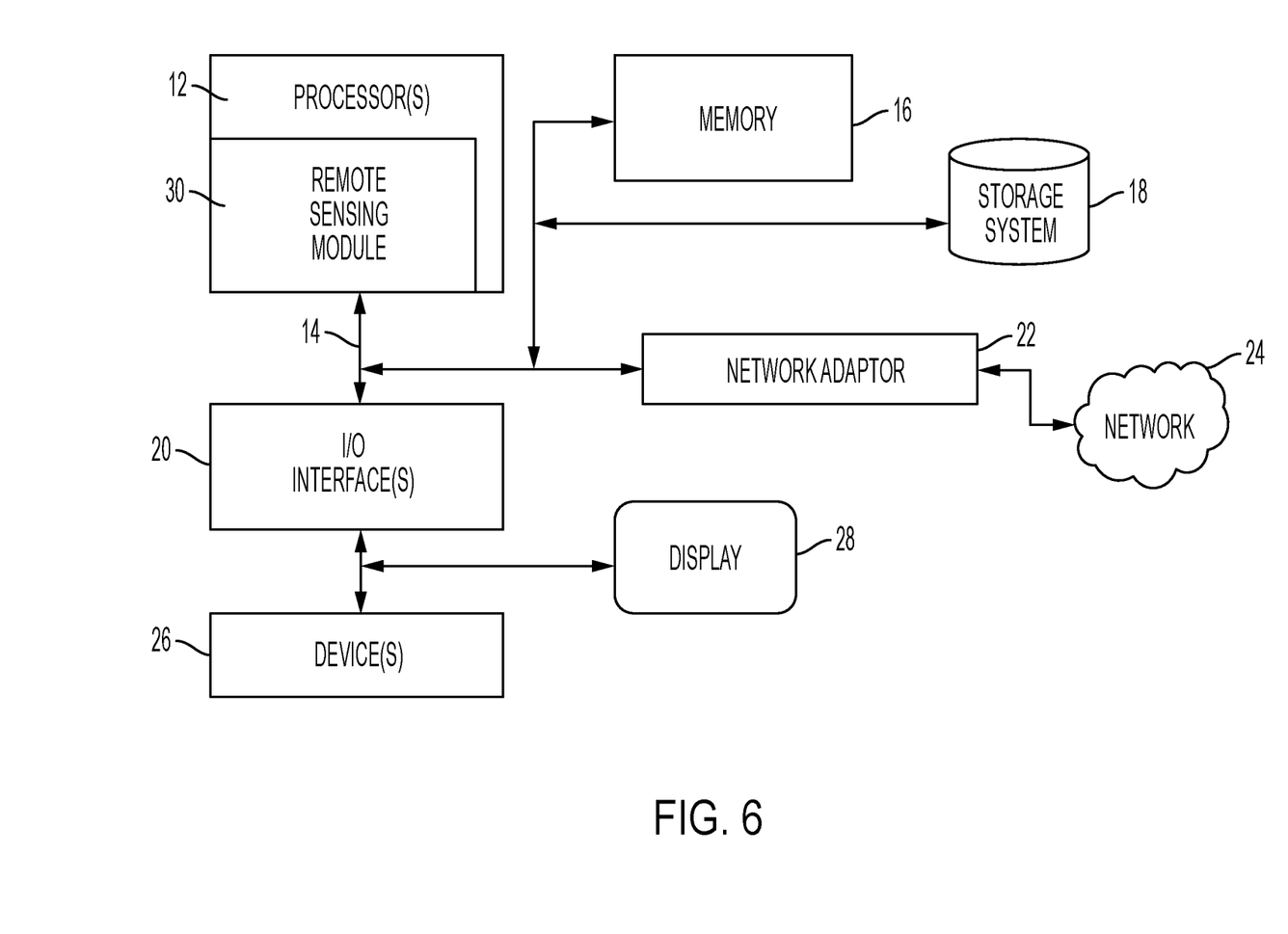
FIG. 6 illustrates a schematic of an example computer or processing system relating to scalable visual analytics in remote sensing applications in one embodiment.

FIG. 6 illustrates a schematic of an example computer or processing system that may implement scalable visual analytics in remote sensing applications in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., remote sensing module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 7:
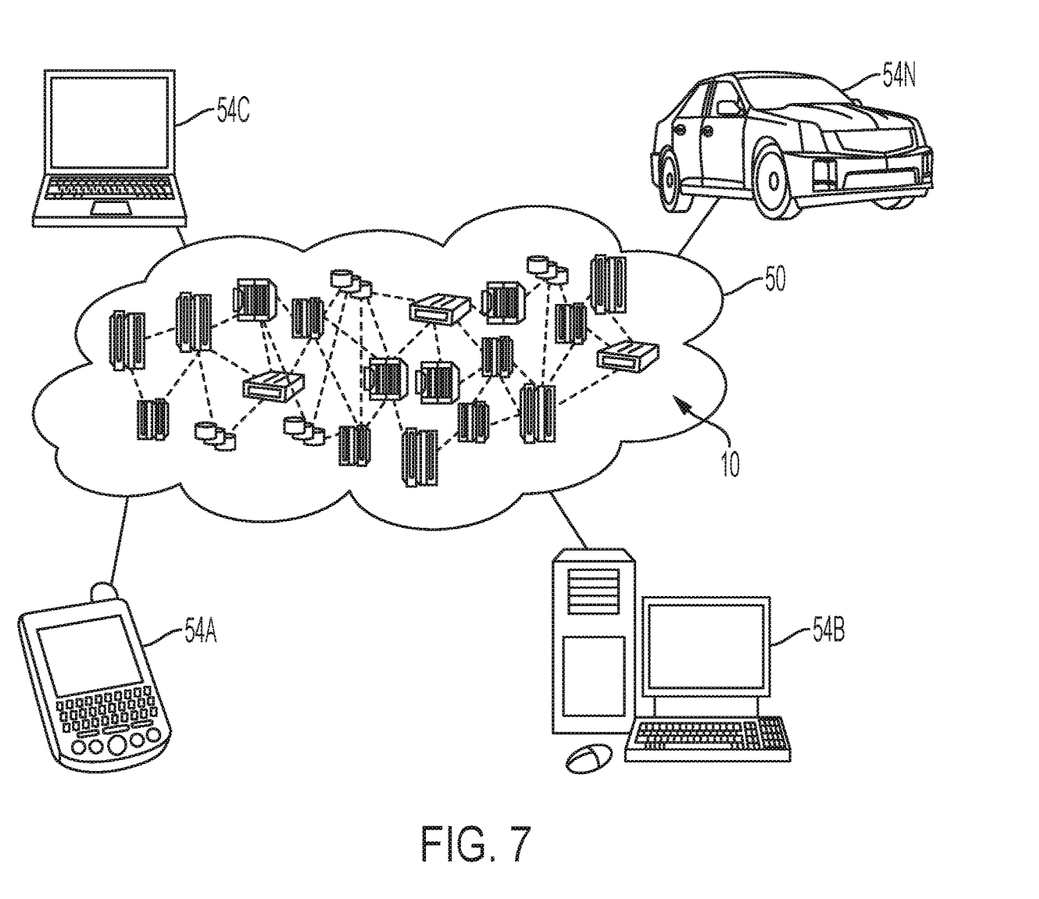
FIG. 7 depicts a cloud computing environment according to an embodiment of the present invention.

FIG. 7 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
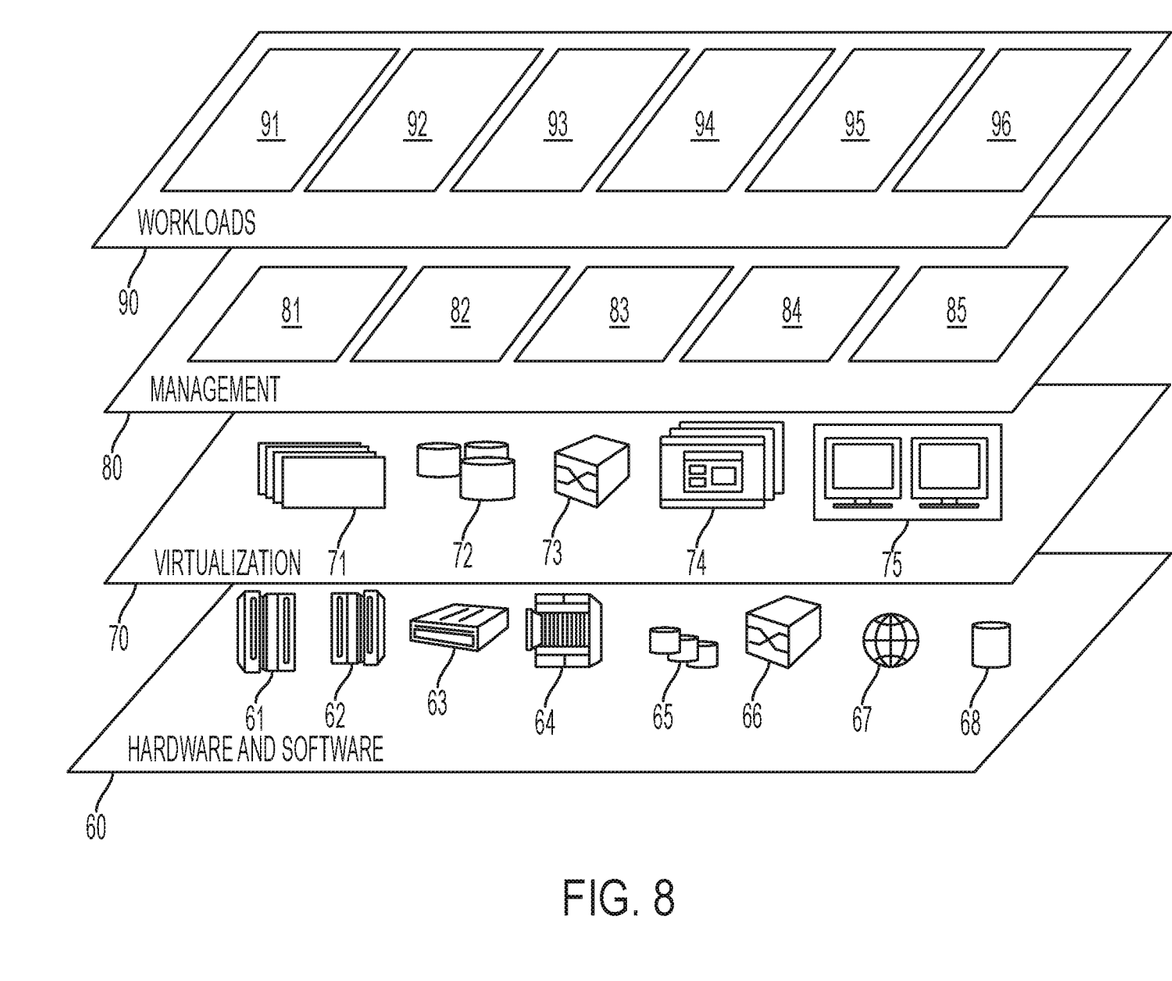
FIG. 8 depicts abstraction model layers according to an embodiment of the present invention.

FIG. 8 depicts abstraction model layers according to an embodiment of the present invention. Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remote sensing application 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for generating a composite image, the method comprising:
   receiving an image having a plurality of points specified in an image space;
   extracting a portion of the image;
   transforming points among the extracted portion from the image space to a parameter space defined by a distance parameter and an orientation parameter, wherein the parameter space is different from the image space;
   identifying a set of intersection points in the parameter space that indicate at least one occurrence of a geometry feature in the extracted portion of the image;
   determining a number of occurrences of the geometry feature in the extracted portion of the image based on the identified set of intersection points;
   generating a plurality of new pixels based on the number of identified occurrences of the geometry feature;
   assigning a pixel value to the plurality of new pixels;
   augmenting the portion of the image with the plurality of new pixels having the assigned pixel value to overlay the extracted portion of the image; and
   generating a composite image using the augmented portion of the image and other augmented portions of the image such that the composite image includes different portions of the image augmented with respective set of new pixels based on transformations from the image space to the parameter space, wherein the composite image includes a grid map showing distributions of different numbers of identified occurrences of the geometry feature.

2. The computer-implemented method of claim 1, wherein the parameter space is a Hough parameter space, and transforming the points among the extracted portion comprises performing a Hough transform on the points among the extracted portion.

3. The computer-implemented method of claim 1, further comprising:
   determining an angle difference between a pair of identified intersection points in the parameter space;
   comparing the angle difference with a threshold; and
   in response to the angle difference being compliant with the threshold, identifying an occurrence of the geometry feature; and
   generating the plurality of new pixels based on the identified occurrence of the geometry feature.

4. The computer-implemented method of claim 1, wherein the geometry feature is a right angle.

5. The computer-implemented method of claim 1, wherein the image is a satellite image.

6. The computer-implemented method of claim 1, further comprising:
   identifying an intersection point in the parameter space having maximum intensity; and
   generating a vector based on the identified intersection point having maximum intensity, wherein the composite image includes a flow map showing directions of different vectors corresponding to the plurality of augmented images.

7. The computer-implemented method of claim 1, further comprising: receiving a request indicating at least one of a characteristic distance;
   determining a distance difference between a pair of identified intersection points in the parameter space;
   comparing the distance difference with the requested characteristic distance; and
   in response to the distance difference being compliant with the requested characteristic distance, identifying a presence of an object in the portion of the image.

8. The method of claim 1, wherein extracting a portion of the image comprises:
   generating a sliding window; and
   implementing a sliding window algorithm to extract the portion of the image.

9. The method of claim 1, further comprising converting the portion of the image into a binary image, wherein transforming the points among the extracted portion comprises transforming points among the binary image from the image space to the parameter space.

10. A system comprising:
    a memory;
    a processor configured to be in communication with the memory, the processor being configured to:
    retrieve an image having a plurality of points specified in an image space;
    extract a portion of the image;
    transform points among the extracted portion from the image space to a parameter space defined by a distance parameter and an orientation parameter, wherein the parameter space is different from the image space;
    identify a set of intersection points in the parameter space that indicate at least one occurrence of a geometry feature in the extracted portion of the image;

determine a number of occurrences of the geometry feature in the extracted portion of the image based on the identified set of intersection points;
generate a plurality of new pixels based on the number of identified occurrences of the geometry feature;
assign a pixel value to the plurality of new pixels;
augment the portion of the image with plurality of new pixels having the assigned pixel value to overlay the extracted portion of the image; and
generate a composite image using the augmented portion of the image and other augmented portions of the image such that the composite image includes different portions of the image augmented with respective set of new pixels based on transformations from the image space to the parameter space, wherein the composite image includes a grid map showing distributions of different numbers of identified occurrences of the geometry feature.

11. The system of claim 10, wherein the parameter space is a Hough parameter space, and the processor is configured to perform a Hough transform to transform the points among the extracted portion.

12. The system of claim 10, wherein the processor is configured to:
determine an angle difference between a pair of identified intersection points in the parameter space;
compare the angle difference with a threshold; and
in response to the angle difference being compliant with the threshold, identify an occurrence of the geometry feature; and
generate the plurality of new pixels based on the identified occurrence of the geometry feature.

13. The system of claim 10, wherein the geometry feature is a right angle.

14. The system of claim 10, wherein the image is a satellite image.

15. The system of claim 10, wherein the processor is configured to:
identify an intersection point in the parameter space having maximum intensity; and
generate a vector based on the identified intersection point having maximum intensity, wherein the composite image includes a flow map showing directions of different vectors corresponding to the plurality of augmented images.

16. A computer program product for generating a composite image, the computer program product comprising a computer readable storage medium having program instructions embodied therewith, the program instructions executable by a processor of a device to cause the device to:
receive an image having a plurality of points specified in an image space;
extract a portion of the image;
transform points among the extracted portion from the image space to a parameter space defined by a distance parameter and an orientation parameter, wherein the parameter space is different from the image space;
identify a set of intersection points in the parameter space that indicate at least one occurrence of a geometry feature in the extracted portion of the image;
determine a number of occurrences of the geometry feature in the extracted portion of the image based on the identified set of intersection points;
generate a plurality of new pixels based on the number of identified occurrences of the geometry feature;
assign a pixel value to the plurality of new pixels;
augment the portion of the image with plurality of new pixels having the assigned pixel value to overlay the extracted portion of the image; and
generate a composite image using the augmented portion of the image and other augmented portions of the image such that the composite image includes different portions of the image augmented with respective set of new pixels based on transformations from the image space to the parameter space, wherein the composite image includes a grid map showing distributions of different numbers of identified occurrences of the geometry feature.

17. The computer program product of claim 16, wherein the parameter space is a Hough parameter space, and the program instructions executable by the processor to cause the device to perform a Hough transform on the points among the extracted portion.

18. The computer program product of claim 16, wherein the geometry feature is a right angle.

19. The computer program product of claim 16, wherein the image is a satellite image.

20. The computer program product of claim 16, wherein the program instructions are executable by the processor of the device to cause the device to:
identify an intersection point in the parameter space having maximum intensity; and
generate a vector based on the identified intersection point having maximum intensity, wherein the composite image includes a flow map showing directions of different vectors corresponding to the plurality of augmented images.

* * * * *